Nov. 19, 1929.  J. FLAMMANG ET AL  1,736,001
PISTON
Filed Jan. 16, 1925
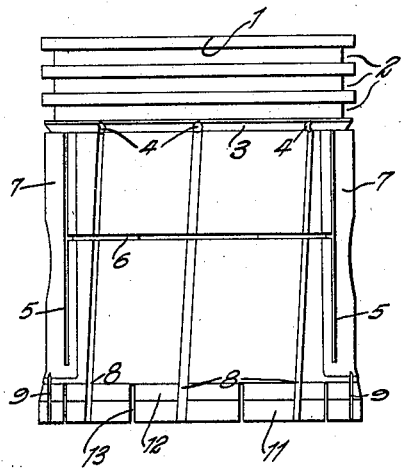
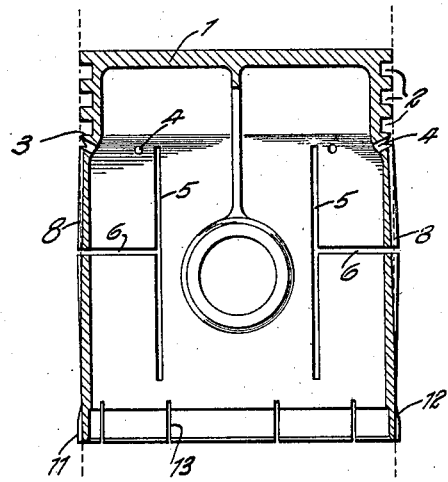
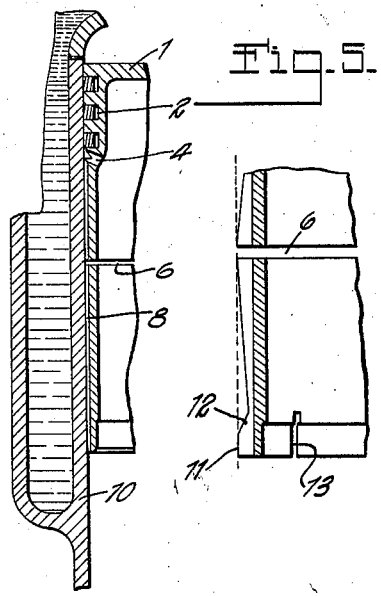
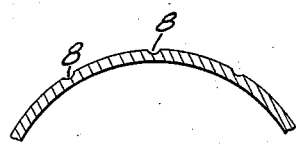
Inventors.
JOHN FLAMMANG AND PERCY L. BOWSER
By John N. Bruninga
A. W. Otbey.

Patented Nov. 19, 1929

1,736,001

UNITED STATES PATENT OFFICE

JOHN FLAMMANG, OF UNIVERSITY CITY, AND PERCY L. BOWSER, OF ST. LOUIS, MISSOURI, ASSIGNORS, BY MESNE ASSIGNMENTS, TO THE STERLING CORPORATION, OF WILMINGTON, DELAWARE, A CORPORATION OF DELAWARE

PISTON

Application filed January 16, 1925. Serial No. 2,836.

This invention pertains to pistons and more particularly to trunk pistons such as are used in internal combustion engines.

In some types of trunk pistons used in internal combustion engines the piston is constructed of a light material such as aluminum or its alloys. This material, however, usually has a coefficient of thermal expansion greater than that of the cylinder in which it works. Consequently the piston is formed with certain portions somewhat larger than the cylinder bore and is then cut or slotted appropriately to form bearing parts which are held in resilient contact with the cylinder wall by the spring of the metal. With such a construction the slots or cuts, which extend entirely through the piston skirt, accumulate oil by the splash of oil from the crank case. The oil collected in these slots, however, may not be effectively distributed on the cylinder wall, on account of the fact that such slots usually have sharp scraping edges and may be positioned so that they bear against the cylinder wall with considerable pressure.

One of the objects of this invention, therefore, is to provide such a piston with means for distributing the accumulated oil over the cylinder wall.

Another object is to provide means for draining the oil from the slots in the piston skirt.

Further objects will appear from the following description taken in connection with the accompanying drawing in which:

Figure 1 is a view in elevation showing a piston embodying this invention;

Figure 2 is a transverse section of the piston shown in Figure 1, taken at right angles to the wrist pin bearings;

Figure 3 is a fragmentary sectional view of the piston skirt showing the grooves on the bearing face thereof; and Figure 4 is a fragmentary sectional view showing the piston in contact with the cylinder wall.

Figure 5 is an enlarged detail of the skirt.

Referring now to the drawing, Figure 1 illustrates trunk piston preferably of the type illustrated in application Serial #693,511 filed February 18, 1924, and having a head 1 provided near the head with packing ring grooves 2, and provided with an external annular oil groove 3 just below the ring grooves 2. The groove 3 communicates, by means of a series of holes 4 drilled through the piston skirt, with the interior of the piston. The oil accumulated in the groove 3 may thus be drained through the holes 4 to the interior of the piston.

In accordance with this invention the piston is constructed of a light material such as aluminum or its alloys and in order to provide for expansion thereof the skirt is slotted with a series of longitudinal slots 5 joined by transverse slots 6 traversing the bearing face of the piston. That portion of the skirt adjacent the traverse slots 6 is formed somewhat larger than the cylinder bore, while the ends of the piston are formed slightly less in diameter than the cylinder bore. It will be seen that this construction provides that the bearing faces adjacent the slots 6 will bear with a resilient pressure against the cylinder walls, and that this bearing will be maintained at all temperatures. That portion of the skirt which lies opposite the ends of the wrist pin bearings may be relieved so as to provide shallow recessed portions 7 which do not contact with the cylinder wall.

A series of shallow oil grooves are cut in the bearing face of the piston and extend longitudinally therealong but at an inclination to the axis of the piston. These grooves connect with the transverse slots 6 and also with the annular groove 3 at the upper end of the piston and extend downwardly to the end of the skirt. In that portion of the bearing face of the piston which extends below the recesses 7 short grooves 9 are cut connecting those recesses with the end of the skirt. These grooves may be inclined similarly to the grooves 8.

In the operation of this piston the interior thereof will ordinarily be flooded with oil by the splash from the crank case. This will cause the oil to collect in the slots 5 and 6. Now the oil will not readily flow from the horizontal slots 6 to the cylinder walls but will rather flow to the vertical slots 5 and hence to the annular groove 3 from which it finds its way to the combustion chamber. The holes 4 do not effectively drain the oil because during the intake or suction stroke the air in the hollow piston is under compression and the holes 4 are necessarily small. The result is, therefore, flow or "pumping" of oil to the combustion chamber.

The provision of the shallow grooves 8 and 9, however, remedies such defect. As the bearing face is in close contact with the cylinder wall 10 as illustrated in Figure 4 the oil collected in the grooves 6, and even in grooves 3 and 5 and space 7, will find its way to the grooves 8 and 9 and will pass into said grooves by capillary action. When the piston has been running a while there will, therefore, be provided at intervals around the piston shallow reservoirs of oil formed by the grooves 8. The oil in these grooves is in contact with the cylinder wall and will, as the piston moves to and fro, be spread over the cylinder surface and perform a lubricating function and will not flow into the combustion chamber to form carbon.

These grooves 8 and 9 thus provide means for distributing the oil over the cylinder wall to lubricate the piston. As the oil is distributed it is constantly replenished in the grooves 8 and 9 on account of their connection with the slots 6 and 5 and also with the annular groove 3 and space 7. It will also be noted that the grooves 8 and 9 are open at both ends so that circulation of oil may take place therethrough. Consequently the possibility of oil becoming stagnant in these grooves is avoided. Therefore, with a continual fresh supply of oil in these grooves there is little chance for the oil becoming heated to the point of carbonization. The inclination of the grooves provides for distributing oil over a substantial extent laterally of the cylinder wall. It will also be understood that the rapid reciprocation of the piston will tend to work the oil along the grooves 8 by a sort of pumping action which maintains a flow through these grooves and obviates the stagnation of oil in the slots 5 and 6 and the groove 3.

It will be seen, therefore, that this invention provides simple and inexpensive means for distributing the oil collected in the slots 6 on the cylinder surface and to promote a continual circulation of oil to prevent stagnation of the same. The grooves 8 also serve to drain the oil from the slots 6 and the recesses 7.

The skirt may also be provided with a flaring rim 11 which is joined to the skirt proper by a beveled portion 12. The external diameter of the rim 11 may be equal or nearly equal to that of the flared middle portion of the skirt. Two bearing points for the piston are thus provided, one at its middle portion and one at its lower rim. The rim may further be split at intervals by slots 13 extending through the rim and substantially through the flared portion 12. This split of the rim renders the same resilient, that it will give with changes on temperature of the piston. The oil grooves 8 and 9 pass through the flared portion of the rim so as to permit the oil to pass therethrough, as previously described.

In the detail of Figure 5 as well as in the other figures the flare of the skirt and rim are greatly exaggerated in order to show them distinctly. In practice these will be only a few thousandths of an inch over the rigid portions of the piston.

There is thus provided a piston which has resilient bearing portions at more than one point along its skirt. These portions are made with enlarged diameters so as to have a firm bearing when the piston is cold and are resilient so as to be able to adjust themselves to changes in temperature as the piston heats up.

It is obvious that various changes may be made in the details of construction without departing from the spirit of this invention; it is to be understood, therefore, that this invention is not to be limited to the specific details shown and described.

Having thus described the invention what is claimed is:

1. A trunk piston having a skirt provided with a transverse slot, the bearing face having a shallow oil distributing groove therealong and connecting with said slot, and means to establish communication between said groove and the interior of the piston at a point remote from the slot.

2. A trunk piston having a skirt provided with a transverse slot, the bearing face having an inclined shallow oil distributing groove therealong and connecting with said slot.

3. A trunk piston having a ring groove and an annular oil groove therebelow connecting with the interior of the piston, the bearing face having oil collecting means thereon and a shallow oil distributing groove therealong and connecting said means with said annular oil groove.

4. A trunk piston having a skirt provided with a transverse slot and with a longitudinal slot connecting therewith, the bearing face having a shallow oil distributing groove therealong and connecting with one of said slots.

5. A trunk piston having a ring groove and an annular oil groove therebelow connecting with the interior of the piston, a skirt having a transverse and a longitudinal slot connecting therewith, the bearing face of the piston having an oil groove therealong and connecting with one of said slots and with said annular oil groove.

6. A trunk piston having a skirt provided with a transverse slot and a longitudinal slot connecting therewith and terminating short of the end of the skirt, thereby to provide a resilient bearing surface for the piston, and a flaring rim split at intervals by slots terminating short of said longitudinal slot, thereby to provide a second resilient bearing surface for the piston.

7. A trunk piston having a skirt provided with a transverse slot and a longitudinal slot connecting therewith and terminating short of the end of the skirt, thereby to provide a resilient bearing surface for the piston and a flaring rim split at intervals by slots terminating short of said longitudinal slot, thereby to provide a second resilient bearing surface for the piston, said skirt being relieved between said bearing surfaces.

8. A trunk piston having a ring groove and an annular oil groove therebelow connecting with the interior of the piston, a skirt transversely and longitudinally slotted to provide oppositely extended substantially rectangular sections, the bearing face of the piston having an oil groove therealong and connecting with one of said slots and with said annular oil groove.

9. A trunk piston having an annular oil groove adjacent the head thereof perforated at intervals to communicate with the interior of the piston, and having a skirt slotted to provide longitudinally and oppositely extending rectangular sections, the bearing face of the piston having an oil groove therealong extending from one of said portions to the other and communicating with said annular oil groove.

In testimony whereof we affix our signatures this 22nd day of December, 1924.

JOHN FLAMMANG.
PERCY L. BOWSER.